United States Patent
Hu (10) Patent No.: US 9,699,276 B2
(45) Date of Patent: Jul. 4, 2017

(54) DATA DISTRIBUTION METHOD AND SYSTEM AND DATA RECEIVING APPARATUS

(71) Applicant: TENCENT TECHNOLOGY (SHENZHEN) COMPANY LIMITED, Shenzhen (CN)

(72) Inventor: Yong Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/213,919

(22) Filed: Jul. 19, 2016

(65) Prior Publication Data

US 2016/0330299 A1  Nov. 10, 2016

Related U.S. Application Data

(63) Continuation of application No. PCT/CN2015/079653, filed on May 25, 2015.

(30) Foreign Application Priority Data

May 26, 2014 (CN) .......................... 2014 1 0224646

(51) Int. Cl.
  *G06F 15/16* (2006.01)
  *H04L 29/06* (2006.01)
  *H04L 29/08* (2006.01)
(52) U.S. Cl.
  CPC .............. *H04L 69/18* (2013.01); *H04L 67/32* (2013.01); *H04L 67/06* (2013.01)
(58) Field of Classification Search
  CPC ......... H04L 69/18; H04L 67/32; H04L 67/06; H04L 29/06; H04L 29/08
  See application file for complete search history.

(56) References Cited

U.S. PATENT DOCUMENTS

| 2004/0203907 A1* | 10/2004 | Hiller | H04W 4/02 |
| | | | 455/456.1 |
| 2010/0082581 A1* | 4/2010 | Kreibe | H04L 67/02 |
| | | | 707/706 |

(Continued)

FOREIGN PATENT DOCUMENTS

| CN | 101132299 A | 2/2008 |
| CN | 101155353 A | 4/2008 |

(Continued)

OTHER PUBLICATIONS

The World Intellectual Property Organization (WIPO) International Search Report for PCT/CN2015/079653 Aug. 27, 2015 p. 1-3.

*Primary Examiner* — Cheikh Ndiaye
(74) *Attorney, Agent, or Firm* — Anova Law Group, PLLC (57) ABSTRACT

A data distribution method and system and a data receiving apparatus are disclosed. The method includes: receiving in parallel data request messages that are sent separately from at least two data receive ends, the data request message including a field for describing requested data; and returning in parallel data corresponding to the fields for describing requested data to data receive ends with the fields for describing requested data that are valid. Non-state of a data transmit end and exclusive file update of a data receive end ensure that an infinite quantity of data receive ends can be supported to update simultaneously, and further breaks through a bottle neck of point to point serial transmission that is always performed according to a data transmission protocol, which becomes a one-to-many parallel application layer data transmission method.

12 Claims, 7 Drawing Sheets

(56) References Cited

U.S. PATENT DOCUMENTS

2011/0239264 A1* 9/2011 Goto ................. H04N 7/15
                                                725/114
2014/0222960 A1* 8/2014 Fang ................ G06F 9/3824
                                                709/217

FOREIGN PATENT DOCUMENTS

CN         101567890 A    10/2009
WO         2005104421 A1  11/2005

* cited by examiner

DATA DISTRIBUTION METHOD AND SYSTEM AND DATA RECEIVING APPARATUS

CROSS-REFERENCES TO RELATED APPLICATIONS

This application is a continuation application of PCT Patent Application No. PCT/CN2015/079653, filed on May 25, 2015, which claims priority to Chinese Patent Application No. 201410224646.8, entitled "DATA DISTRIBUTION METHOD AND SYSTEM AND DATA RECEIVING APPARATUS" filed on May 26, 2014, the entire contents of both of which are incorporated herein by reference.

FIELD OF THE TECHNOLOGY

Implementation manners of the present disclosure relate to the field of data transmission technologies, and in particular, to a data distribution method and system and a data receiving apparatus.

BACKGROUND OF THE DISCLOSURE

In the current information era, various information devices emerge as the time requires, such as a fixed-line phone and a mobile phone used for voice transmission, a server and a personal computer (PC) used for information resource sharing and processing, and various televisions used for video data displaying. All these devices are produced for addressing an actual need in a specific field. With the arrival of merging of electronic consumption, computer, and communication (3C), people pay more attention to a study on comprehensive utilization of information devices in different fields, so as to fully use existing resource devices to better serve people.

In various real-time systems, newly-generated data often needs to be placed into an application system in real time, so as to apply the real-time data, which relates to a one-to-many data transmission problem. Currently, there is no one-to-many data transmission protocol that can be directly used for a one-to-many data transmission scenario in the existing technology. There are following three similar protocols: (1) FTP based on TCP; (2) TFTP based on UDP; and (3) Secure Copy Protocol (SCP).

The above three protocols are all point to point transmission protocols. However, when it is faced with a one-to-many transmission demand, first, a data receiver list needs to be maintained, and serial data distribution is then performed according to the list in a point to point data transmission manner such as FTP, TFTP, or SCP; due to serial data distribution, when a receiver is blocked, an entire distribution process is blocked; as a result, data transmission efficiency is reduced; moreover, this technology needs to maintain the receiver list, and when a receiver is added or removed, the list needs to be modified, so that an operation and maintenance amount is increased; in addition, an omitted receiver cannot be sensed, and network bandwidth of a data transmit end cannot be fully used, and a waste of bandwidth further exists.

SUMMARY

Implementation manners of the present disclosure provide a data distribution method and system, so as to improve data transmission efficiency.

The implementation manners of the present disclosure further provide a data receiving apparatus, so as to improve the data transmission efficiency.

Specific solutions of the implementation manners of the present disclosure are as follows.

A data distribution method includes: at a computing device having one or more processors and a memory storing programs executed by the one or more processors: receiving in parallel data request messages that are sent separately from at least two data receive ends, the data request message including a field for describing requested data; and returning in parallel data corresponding to the fields for describing requested data to data receive ends with the fields for describing requested data that are valid.

A data distribution system includes: at least two data receive ends, configured to send in parallel respective data request messages to a data transmit end, the data request message including a field for describing requested data; and the data transmit end, configured to return in parallel data corresponding to the fields for describing requested data to data receive ends with the fields for describing requested data that are valid.

A data receiving apparatus includes: a data request message sending unit and a data receiving unit, where the data request message sending unit is configured to create data request messages, and send the data request messages, the data request message including a field for describing requested data; and a data receiving unit is configured to receive data corresponding to the fields for describing requested data, the data being returned in parallel when the fields for describing requested data are valid.

In can be seen from the foregoing technical solutions that, in the implementation manners of the present disclosure, data request messages that are sent separately from at least two data receive ends are received in parallel, the data request message including a field for describing requested data; and data corresponding to the fields for describing requested data is returned in parallel to data receive ends with the fields for describing requested data that are valid. Therefore, after the implementation manners of the present disclosure are applied, a data transmit end no longer stores a data transmission state; the data receive end takes the data transmit end exclusively; and data receive ends keeps independent of each other, so that data transmission efficiency can be improved.

Other aspects of the present disclosure can be understood by those skilled in the art in light of the description, the claims, and the drawings of the present disclosure.

DESCRIPTION OF EMBODIMENTS

To make the objective, technical solutions, and advantages of the present disclosure clearer, the following further describes the present disclosure in detail with reference to the accompanying drawings.

To make description be brief and intuitive, the following describes the solutions of the present disclosure by describing several representative implementation manners. A great quantity of details of the implementation manners are only used to help understand the solutions of the present disclosure. However, obviously, implementation of the technical solutions of the present disclosure may be not limited to these details. To avoid making the solutions of the present disclosure obscure, some implementation manners are not described in detail, but only a framework is given. In the following description, "including" means "including, but not limited to,", and "according to . . . " means "at least according to . . . , but the basis is not limited to . . . ." Due to the language convention of Chinese, when the number of elements is not specified in the following description, it means that there may be one or more elements, or it may be understood that there is at least one element.

In the implementation manners of the present disclosure, to solve a problem that data resources (which include, but are not limited to, an advertisement order, dsp information, advertisement position information, an IP database and various configuration files) are distributed to multiple machines, a serial data distribution solution using FTP/TFTP/SCP is replaced by designing transmission using an application layer protocol based on UDP.

For example, in various applications based on the Internet, background development is often confronted with such a demand: pushing memory data (for example, a memory data table in which data is completely written, or a data structure in which indexes are established and sorted) on a machine to memories of other machines unidirectionally. An implementation manner of the present disclosure provides a new unidirectional memory transmission service, which can unidirectionally transmit data that is written into memory to distributed cluster memories directly. Based on a one-to-many transmission method of the present disclosure, various memory mirrors can be quickly distributed, which ensures consistency of data and a real-time feature of an application, and improves reliability of distribution and greatly reduces an operation and maintenance amount.

Figure 1:
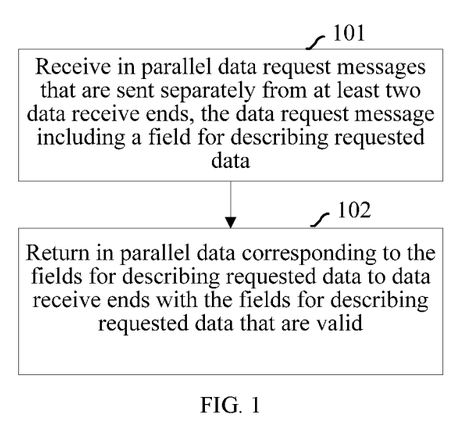
FIG. 1 is a flowchart of a data distribution method according to an implementation manner of the present disclosure.

FIG. 1 is a flowchart of a data distribution method according to an implementation manner of the present disclosure.

As shown in FIG. 1, the method includes the following steps.

Step 101: Receiving in parallel data request messages that are sent separately from at least two data receive ends, the data request message including a field for describing requested data.

Step 102: Returning in parallel data corresponding to the fields for describing requested data to data receive ends with the fields for describing requested data that are valid.

In an implementation manner, the method further includes: returning in parallel state reset messages to data receive ends with the fields for describing requested data that are invalid, where the state reset message includes data description information; constructing, by the data receive ends that receive the state reset messages, updated data request messages based on the data description information, where the updated data request message includes an updated field for describing requested data; and receiving the updated data request messages, and returning in parallel data corresponding to the updated fields for describing requested data to data receive ends with the updated fields for describing requested data that are valid.

In an implementation manner, the field for describing requested data includes a data category command number, a data sequence number, a data type and a data version number, where it is determined, when the data category command number matches a data category command number of existing data, and at least one of the data sequence number, the data type and the data version number does not match a data sequence number, a data type and a data version number of the existing data, that the field for describing requested data is invalid; and/or it is determined, when the data category command number matches a data category command number of existing data, and the data sequence number, the data type and the data version number match a data sequence number, a data type and a data version number of the existing data respectively, that the field for describing requested data is valid.

In an implementation manner, the method further includes: progressively increasing, by the data receive end after completely receiving data each time, the data version number in the field for describing requested data to form a data request message again; and receiving the data request message formed again, returning data corresponding to the progressively increased data version number when the data corresponding to the progressively increased data version number exists, and ending the procedure when the data corresponding to the progressively increased data version number does not exist.

In an implementation manner, the data receive end maintains data transmission state information of the data receive end separately. Moreover, the data transmission state information includes at least one of the following:

(1) a serial number of a current data request message;

(2) a time of sending a data request message last time;

(3) a quantity of packets (i.e., packages) expected by each data request message;

(4) a sequence number of a current packet in a current data request message; and (5) a time of current data update.

Figure 2:
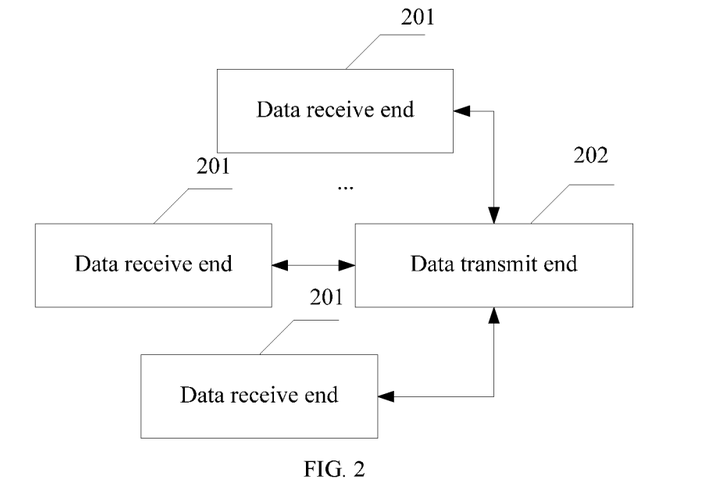
FIG. 2 is a structural diagram of a data distribution system according to an implementation manner of the present disclosure.

Based on the foregoing analysis, FIG. 2 is a structural diagram of a data distribution system according to an implementation manner of the present disclosure.

As shown in FIG. 2, the data distribution system includes: at least two data receive ends 201, configured to send in parallel respective data request messages to a data transmit end 202, the data request message including a field for describing requested data; and the data transmit end 202, configured to return in parallel data corresponding to the fields for describing requested data to data receive ends with the fields for describing requested data that are valid.

In an implementation manner, the data transmit end 202 is further configured to return in parallel state reset messages to data receive ends with the fields for describing requested data that are invalid, where the state reset message includes data description information; the data receive ends 201 that receive the state reset messages are further configured to construct updated data request messages based on the data description information, where the updated data request message includes an updated field for describing requested data; and the data transmit end 202 is further configured to receive the updated data request messages, and return in parallel data corresponding to the fields for describing requested data to data receive ends with the fields for describing requested data that are valid.

In an implementation manner, the field for describing requested data includes a data category command number, a data sequence number, a data type and a data version number, where the data transmit end 202 is configured to: determine, when the data category command number matches a data category command number of existing data, and at least one of the data sequence number, the data type and the data version number does not match a data sequence number, a data type and a data version number of the existing data, that the field for describing requested data is invalid; and/or determine, when the data category command number matches a data category command number of existing data, and the data sequence number, the data type and the data version number match a data sequence number, a data type and a data version number of the existing data respectively, that the field for describing requested data is valid.

In an implementation manner, the data receive end 201 is further configured to progressively increase, after completely receiving data each time, the data version number in the field for describing requested data to form a data request message again; and the data transmit end 202 is further configured to receive the data request message formed again, return data corresponding to the progressively increased data version number when the data corresponding to the progressively increased data version number exists, and end the procedure when the data corresponding to the progressively increased data version number does not exist.

In an implementation manner, the data receive ends 202 are further configured to maintain data transmission state information of the data receive ends separately, where the data transmission state information includes at least one of the following: a serial number of a current data request message; a time of sending a data request message last time; a quantity of packets expected by each data request message; a sequence number of a current packet in the current data request message; and a time of current data update.

Figure 3:
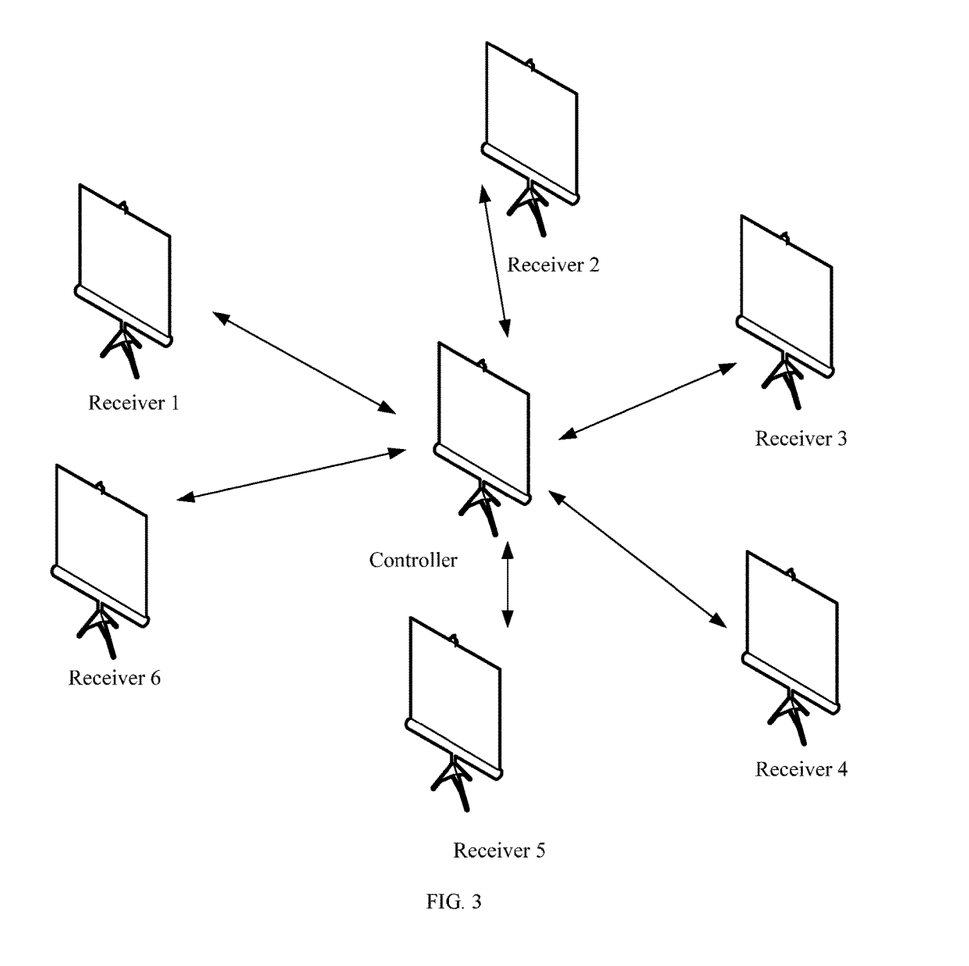
FIG. 3 is an exemplary structural diagram of a data distribution system according to an implementation manner of the present disclosure.

FIG. 3 is an exemplary structural diagram of a data distribution system according to an implementation manner of the present disclosure.

As shown in FIG. 3, the system includes multiple receivers, which are a receiver 1, a receiver 2, a receiver 3, a receiver 4, a receiver 5 and a receiver 6; and a controller. The controller is configured to provide data to each receiver.

First, a receiving service is started on each receiver to wait to receive data. After each receiver is ready, a distribution procedure is started. Each receiver sends a data request message to the controller respectively, and the controller starts to distribute data in parallel to all the receivers. A distribution speed may be high or low according to a network condition of the receiver (assuming that a fastest time to complete data transmission is t, and a slowest time is 30t). Assuming that a transmission speed of the receiver 1 is highest, and the transmission is completed, the data can be directly provided to the receiver 1 for service use. The receivers that do not complete transmission continue to transmit data without affecting each other. Assuming that a transmission speed of the receiver 5 is lowest, and after other machines complete transmission, the receiver 5 still continues the transmission. However, this does not affect other machines in using new data. Because of existence of the data request message, the controller can control a current transmission progress in real time (that is, which machines complete transmission and which machines still perform transmission) until a last machine completes transmission.

For example, the data to be transmitted to the receivers may contain a total of 99 data packages. Assuming the data transmission to the six receivers start at a same time in parallel, when a duration of 15t is passed, the receiver 1 (with the fastest transmission speed) may receive all 99 data packages and completed the data transmission; the receiver 2 (with a medium transmission speed) may have received 54 data packages and is asking the controller to send the 55th data package; the receiver 6 (with the slowest transmission speed) may have received 20 data package and is receiving the 21th data package from the controller.

The following describes the implementation manners of the present disclosure with reference to a specific message structure and an application example.

Figure 4:
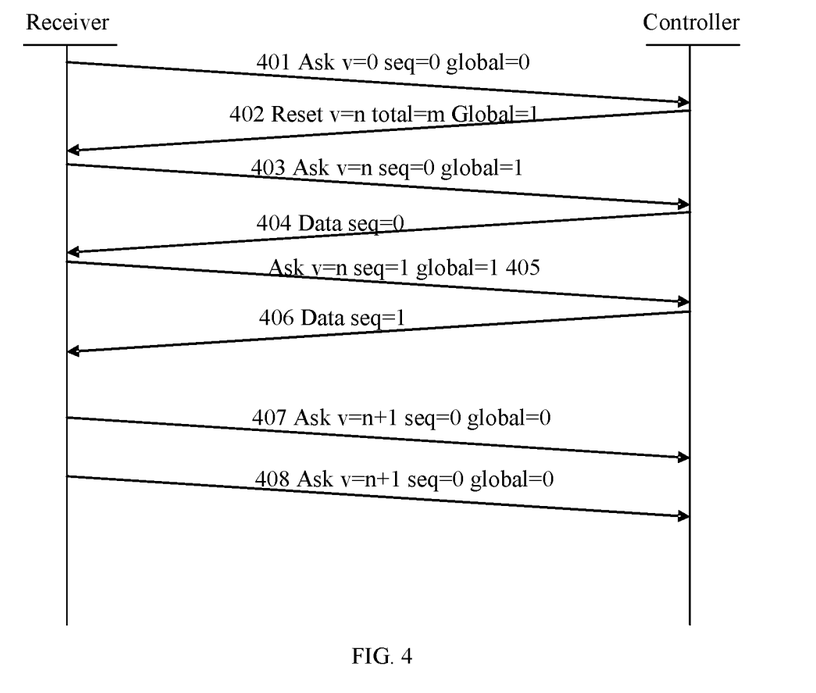
FIG. 4 is a schematic diagram of a message procedure of data distribution according to an implementation manner of the present disclosure.

FIG. 4 is a schematic diagram of a message procedure of data distribution according to an implementation manner of the present disclosure.

As shown in FIG. 4, the method includes the following steps. The protocol used by the controller and the receivers may be named ASK. The ASK protocol may include three types of messages: request-type, data-type, and reset-type.

Step 401: Starting each receiver to send in parallel a respective data request message to a controller located at a server side to request data, where each data request message includes a field for describing requested data for describing the requested data.

An exemplary structure of the field for describing requested data (i.e., request-type message) is as follows:

Cmd[4Byte]: describes a data category command number of the currently requested data;

Type[1Byte]: describes a type of the message, where a fixed value is 0;

Ptl_version[1Byte]: describes a protocol version number, where a fixed value is 0;

Len[2Byte]: describes the length of a body of the message;

Data_version[4Byte]: describes a data version;

Global_flag[4Byte]: describes a data type, which is full/incremental/another type;

Seq[4Byte]: describes a data sequence number that is expected to be obtained; and Data_pkg_count[4Byte]: describes a quantity of response packets that the request needs, where it may be 1 (that is, a size of a sliding window) by default.

In this step, exemplarily, the receiver requests data of (ASK)Data_version=0; Seq=0; Global_flag=0.

Step 402: The controller reads a data category command number (Cmd) of each data request message separately after receiving each data request message; discards the data request message if it is found that the data category command number in the data request message does not match a data category command number of existing data of the controller; continues to read a data version number (Data_version), a data sequence number (Seq), and a data type (Global_flag) in the data request message and performs matching between the data version number (Data_version), the data sequence number (Seq), and the data type (Global_flag) in the data request message and a corresponding data version number, data sequence number and data type of the existing data of the controller if it is found that the data category command number in the data request message matches the existing data of the controller; when at least one of the data sequence number, the data type and the data version number does not match, determines that the field for describing requested data in the data request message is invalid, and sends a state reset message (reset) to a receiver corresponding to the read invalid data request message, so as to reset a state of the receiver, where the state reset message includes a version(n), Total_count(m), and a global state of a current cmd of the existing data of the controller.

Content of fields in the state reset message (i.e., reset-type message) are exemplarily described as follows:

Cmd[4Byte]: describes a data category command number of the currently requested data;

Type[1Byte]: describes a type of the message, where a fixed value is 1;

Ptl_version[1Byte]: describes a protocol version number, where a fixed value is 0;

Len[2Byte]: describes the length of a body of the message;

Data_version[4Byte]: describes a data version; and

Total_count[4Byte]: describes a total amount of data that needs to be updated this time.

In this step, exemplarily, because (ASK)Data_Version=0; Seq=0; Global_flag=0 requested by the receiver does not match the existing data of the controller, field information Data_version=n; Total_count=4; Global_flag=1 is returned in the state reset message.

Step 403: The receiver requests data again according to specification of the state reset message and re-sends an updated data request message after receiving the state reset message.

In this step, exemplarily, the receiver requests data of Data_version=n; Seq=0; Global_flag=1. In some embodiments, the receiver may send a valid request in the beginning. In other words, steps 401 and 402 may be omitted. The data distribution procedure may start from step 403.

Step 404: The controller reads the updated data request message and performs matching on Cmd, version, Seq, and Global_flag in the updated data request message, and after verification succeeds, assembles Data_pkg_count pieces of data (i.e., data packages) to be included in a Data message (i.e., data-type message), so as to be sent to the receiver.

The Data message is a message sent by a server end to the receiver, and specifically, the server end sends, according to the data request message sent by the receiver, data required by the receiver to the receiver.

Content of fields in the Data message is as follows:

Cmd[4Byte]: a data category command number of the currently requested data;

Type[1Byte]: a type of the message, where a fixed value is 2;

Ptl_version[1Byte]: a protocol version number, where a fixed value is 0;

Len[2Byte]: the length of a body of the message;

Data_version[4Byte]: a data version;

Seq[4Byte]: a data sequence number that is expected to be obtained;

Count[4Byte]: a size of data carried by the message;

Total_count[4Byte]: a total amount of data that needs to be updated this time; and Data[Count]: the data carried in this message.

Step 405 to Step 406: The receiver recombines/reassembles a data request message after receiving the Data_pkg_count pieces of data, so as to continue to request a next batch of Data_pkg_count pieces of data (Step 405). The controller may validate to the request and continue to send the next batch of data (Step 406). The receiver and the controller may repeat the procedure (steps 405 and 406) until data sending is completed.

Step 407: When the receiver determines that the last piece of data is received based on the field (Total_count): the total amount of data that needs to be updated this time, the receiver resets the state, increases version by 1 automatically, and re-sends the data request message to request data of a next version; and the controller discards the message after receiving the data request message and finding that the requested version number is early (i.e., the requested version number is greater than the version number on the controller).

Step 408: The receiver re-sends the data request message (to deal with a situation of a packet loss) if the receiver does not receive a response packet within a predetermined time (such as 3 s) after sending the data request message each time. For example, the receiver may periodically send a data request message to request for a next version (version n+1) of data. When the data version on the controller is n, the controller discards the request message; and when data version n+1 becomes available on the controller, the controller determines that the request message is valid and sends the data version n+1.

Figure 5:
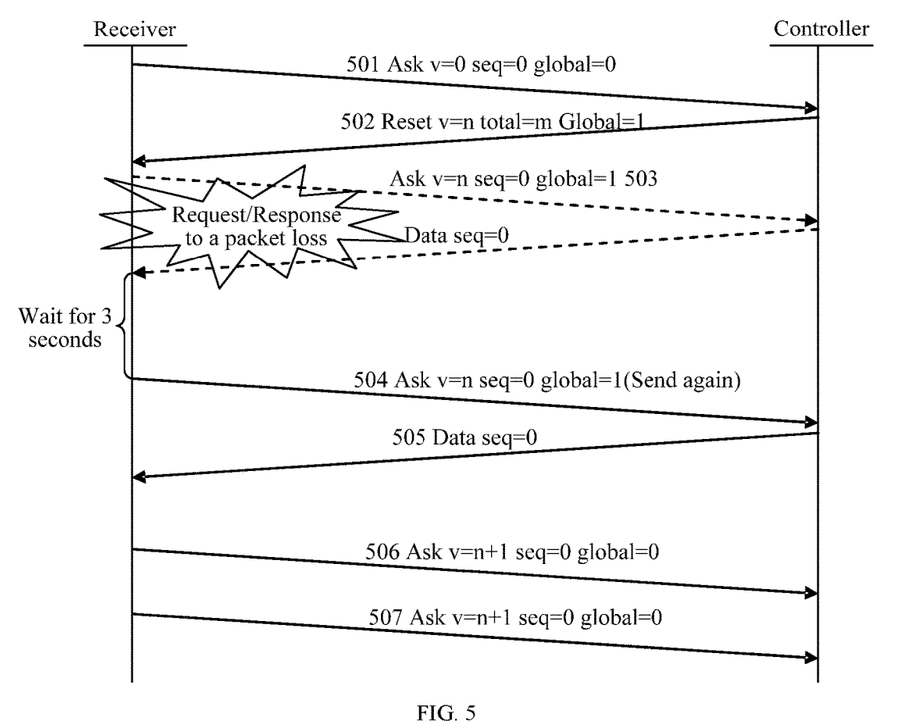
FIG. 5 is another schematic diagram of a message procedure of data distribution according to an implementation manner of the present disclosure.

FIG. 5 is another schematic diagram of a message procedure of data distribution according to an implementation manner of the present disclosure.

As shown in FIG. 5, the method includes the following steps.

Step 501: Starting each receiver to send in parallel a respective data request message to a controller located at a server side to request data, where each data request message includes a field for describing requested data for describing the requested data.

In this step, exemplarily, the receiver requests data of (ASK)Data_Version=0; Seq=0; Global_flag=0.

Step 502: The controller reads a data category command number (Cmd) of each data request message separately after receiving each data request message; discards the data request message if it is found that the data category command number in the data request message does not match a data category command number of existing data of the controller; continues to read a data version number (Data_version), a data sequence number (Seq), and a data type (Global_flag) in the data request message and performs matching between the data version number (Data_version), the data sequence number (Seq), and the data type (Global_flag) in the data request message and a corresponding data version number, data sequence number and data type of the existing data of the controller if it is found that the data category command number in the data request message matches the existing data of the controller; when at least one of the data sequence number, the data type and the data version number does not match, determines that the field for describing requested data in the data request message is invalid, and sends a state reset message (reset) to a receiver corresponding to the read invalid data request message, so as to reset a state of the receiver, where the state reset message includes a version(n), Total_count(m), and a global state of a current cmd of the existing data of the controller.

In this step, exemplarily, because (ASK)Data_Version=0; Seq=0; Global_flag=0 requested by the receiver does not match the existing data of the controller, field information Data_version=n; Total_count=m; Global_flag=1 is returned in the state reset message.

Step 503: The receiver requests data again according to specification of the state reset message and re-sends an updated data request message after receiving the state reset message.

In this step, exemplarily, the receiver requests data of Data_Version=n; Seq=0; Global_flag=1.

The receiver re-sends the data request message (to deal with a situation of a packet loss) if the receiver does not receive a response packet within a predetermined time (such as 3 s) after sending the data request message each time.

Step 504: Re-sending the data request message if data is still not received after waiting for the predetermined time (e.g., 3 s). The receiver requests data of Data_Version=n; Seq=0; Global_flag=1.

Step 505: The controller reads the data request message and performs matching on Cmd, version, Seq, and Global_flag in the data request message, and after verification succeeds, combines Data_pkg_count pieces of data to be a Data message, so as to be sent to the receiver. The Data message is a message sent by a server end to the receiver, and specifically, the server end sends, according to the data request message sent by the receiver, data required by the receiver to the receiver.

Herein, exemplarily, the receiver returns data of Data_version=n; Seq=0; Global_flag=1.

Step 506 to Step 507: When the receiver determines that the last piece of data is received based on the field (Total_count): the total amount of data that needs to be updated this time, the receiver resets the state, increases version by 1 automatically, and re-sends the data request message to request data of a next version; and the controller discards the message after receiving the data request message and finding that a version number is early.

A user can perform processing of the present disclosure on various receivers or controllers, where the receivers or controllers may include, but are not limited to, functional mobile phones, smart phones, palmtop computers, PCs, tablet computers or personal digital assistants (PDAs), and the like.

Although specific examples of the receiver or the controller are listed in detail above, a person skilled in that art may realize that the listing is merely for description and is not used to limit the protection scope of the implementation manners of the present disclosure.

The data distribution method of the present disclosure has the following features.

(1) Non-state: in the entire procedure, a data transmit end (the controller) does not store a data transmission state, and each data receive end (the receiver) maintains a data transmission state of the data receive end itself. From the perspective of the data receive end, each data receive end (the receiver) takes the data transmit end (the controller) exclusively, and each data receive end (the receiver) keeps independent of each other.

(2) High concurrency and a high speed: concurrent/parallel data distribution to each data receive end (the receiver) can be greatly supported, and a concurrent amount (i.e., the number of receivers concurrently receiving data from the controller) thereof theoretically may be infinite; the data receive ends do not affect each other; and bandwidth resources of the data transmit end (the controller) are shared by all the receivers.

(3) No operation and maintenance need: a request for data distribution is initiated actively by the data receive end (receiver), so that the data transmit end (the controller) does not need to maintain a receiver list; and when a new machine is added, the data transmit end (the controller) does not need to actively sense.

(4) Fully using bandwidth: after the data transmit end (the controller) replies a message to a receiver A, because of network latency, vacancy time exists before the data transmit end (the controller) receives a next data request message of the receiver A; this period of vacancy time may be used to serve machines such as receivers B, C and D; in this way, CPU resources and bandwidth resources of the data transmit end (the controller) are fully used; and when the concurrent amount is large, network traffic of the data transmit end (the controller) may reach an upper limit of a network interface card.

(5) No traffic traversal: the data transmit end (the controller) needs to wait for a next data request message after sending data completely each time, and then continues to send in response to the next data request message; therefore, when a data distribution amount is large, a lot of vacancy time exists between the data receive end (the receiver) and the data transmit end (the controller), so that data sending is not always kept; in this way, sudden occupation on public bandwidth resources is avoided naturally; when a data mount of the data receive end (the receiver) is large, traffic overlap does not occur either; and because all the data receive ends (the receivers) are not distributed on a same rack in a same equipment room, a switch and a router that are passed through are not exactly the same; in this way, pressure is not caused to a switching device of a core node.

(6) Convenience for monitoring: each data receive end (the receiver) can send a data request message at a regular time (such as 3 s), so as to form a heartbeat message; which receivers are connected to the data transmit end (the controller) can be directly observed at the data transmit end (the controller); and which receivers complete update and which receivers still do not complete update can also be directly observed in real time according to Data_version of the data request message.

(7) Distribution acceleration for long network latency: when distributing data to a non-local receiver, a low speed is mainly caused by long network latency; Data_pkg_count (a sliding window) of a data request message just needs to be increased for such a machine; and assuming that the sliding window is 1, and a distribution time is T, if Data_pkg_count is modified to n, the distribution time is changed to t=T/n, where t may theoretically be close to a time slice of network latency.

(8) Supporting both single distribution and group distribution: because the data transmit end (the controller) is non-state, and the receivers are independent of each other, when all other receivers complete distribution, distribution can be performed again separately for a newly added machine; when group distribution is needed, the group distribution can be started as long as the data transmit end (the controller) modifies a data version number (the data version number is increased by 1 to become a version number that is needed by the receiver); single distribution is generally initiated by the receiver, and group distribution is generally initiated by the data transmit end (the controller).

(9) No blocking phenomenon: compared with previous serial distribution, serial distribution is changed to parallel distribution, so that failure of a standalone computer certainly does not affect an overall distribution speed.

(10) Incremental update and full update: in the case of a large amount of data, the Global_flag field of the present disclosure provides two (full/incremental) data update manners; and when incremental update is performed, a part where data changes is distributed to be updated into full data according to service logic of a service party by the service party.

In the present disclosure, non-state of a data transmit end (a controller) and exclusive file update of a data receive end ensure that an infinite quantity of data receivers can be supported to update simultaneously, and further breaks through a bottle neck of point to point serial transmission that is always performed according to a data transmission protocol, which becomes a one-to-many parallel application layer data transmission method.

Based on the foregoing detailed analysis, an implementation manner of the present disclosure further provides a data receiving apparatus.

Figure 6:
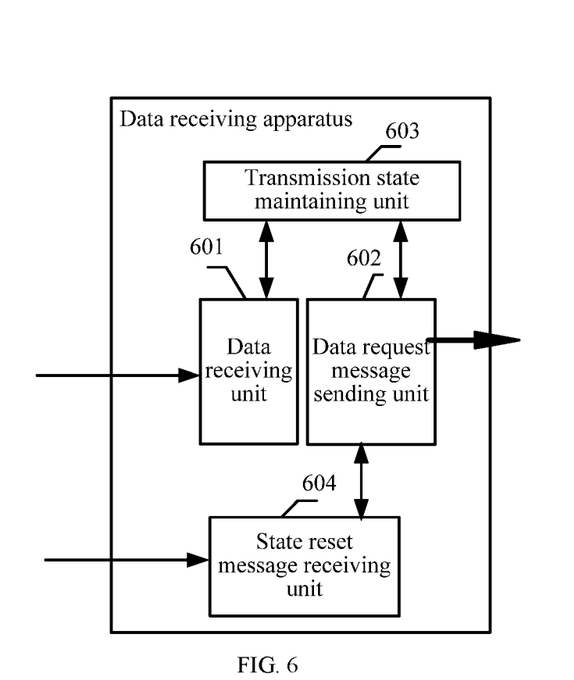
FIG. 6 is a structural diagram of a data receiving apparatus according to an implementation manner of the present disclosure.

FIG. 6 is a structural diagram of a data receiving apparatus according to an implementation manner of the present disclosure.

As shown in FIG. 6, the apparatus includes a data request message sending unit 602 and a data receiving unit 601, where the data request message sending unit 602 is configured to create data request messages, and send the data request messages, the data request message including a field for describing requested data; and the data receiving unit 601 is configured to receive data corresponding to the fields for describing requested data, the data being returned in parallel when the fields for describing requested data are valid.

In an implementation manner, the apparatus further includes: a state reset message receiving unit 604, configured to receive state reset messages, where the state reset messages are returned in parallel when the fields for describing requested data are invalid, and the state reset message includes data description information, where the data request message sending unit 602 is further configured to construct updated data request messages based on the data description information, where the updated data request message includes an updated field for describing requested data; and the data receiving unit is further configured to receive data corresponding to the updated fields for describing requested data, where the data is returned in parallel when the updated fields for describing requested data are valid.

In an implementation manner, the field for describing requested data includes a data category command number, a data sequence number, a data type and a data version number, where it is determined, when the data category command number matches a data category command number of existing data, and at least one of the data sequence number, the data type and the data version number does not match a data sequence number, a data type and a data version number of the existing data, that the field for describing requested data is invalid; and/or it is determined, when the data category command number matches a data category command number of existing data, and the data sequence number, the data type and the data version number match a data sequence number, a data type and a data version number of the existing data respectively, that the field for describing requested data is valid.

In an implementation manner, the data request message sending unit 602 is further configured to progressively increase, after data is received completely, the data version number in the field for describing requested data to form a data request message again.

In an implementation manner, the apparatus further includes: a transmission state maintaining unit 603, configured to maintain data transmission state information of the apparatus, where the data transmission state information includes at least one of the following: a serial number of a current data request message; a time of sending a data request message last time; a quantity of packets expected by each data request message; a sequence number of a current packet in the current data request message; and a time of current data update.

Figure 7:
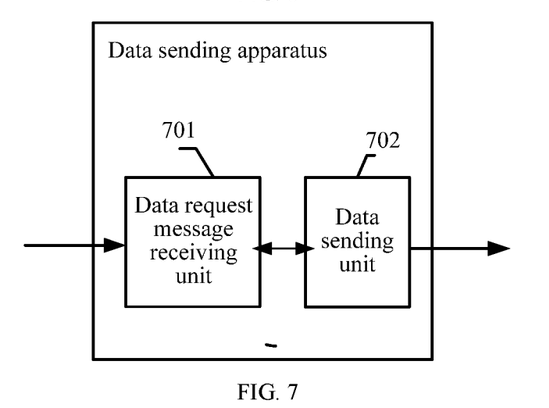
FIG. 7 is a structural diagram of a data sending apparatus according to an implementation manner of the present disclosure.

FIG. 7 is a structural diagram of a data sending apparatus according to an implementation manner of the present disclosure.

As shown in FIG. 7, the apparatus includes a data request message receiving unit 701 and a data sending unit 702, where the data request message receiving unit 701 is configured to receive in parallel data request messages that are sent separately from at least two data receive ends, the data request message including a field for describing requested data; and the data sending unit 702 is configured to return in parallel data corresponding to the fields for describing requested data to data receive ends with the fields for describing requested data that are valid.

In an implementation manner, the data sending unit 702 is further configured to return in parallel state reset messages to data receive ends with the fields for describing requested data that are invalid, where the state reset message includes data description information; receive an updated data request message that is constructed based on the data description information, where the updated data request message includes an updated field for describing requested data; receive the updated data request messages, and return in parallel data corresponding to the fields for describing requested data to data receive ends with the fields for describing requested data that are valid.

In an implementation manner, the field for describing requested data includes a data category command number, a data sequence number, a data type and a data version number, where it is determined, when the data category command number matches a data category command number of existing data, and at least one of the data sequence number, the data type and the data version number does not match a data sequence number, a data type and a data version number of the existing data, that the field for describing requested data is invalid; and/or it is determined, when the data category command number matches a data category command number of existing data, and the data sequence number, the data type and the data version number match a data sequence number, a data type and a data version number of the existing data respectively, that the field for describing requested data is valid.

In an implementation manner, the data sending unit 702 is further configured to receive a data request message that is formed again based on progressively increasing the data version number in the field for describing requested data, return data corresponding to the progressively increased data version number when the data corresponding to the progressively increased data version number exists, and end the procedure when the data corresponding to the progressively increased data version number does not exist.

Actually, the present disclosure may be performed in various applications. An example in which network promotion (such as a network advertisement position) information and order information are distributed is used for description. When it is found that order data or advertisement position data (which includes, but is not limited to, various forms of memory data such as a data table, a structure body and a resource picture) changes, the order data and the advertisement position data need to be synchronized to multiple machines of an ADX ask-bid system. At this time, a distribution service is started on a main-controlling machine, and a receiving service is started on an ADX machine; an inspecting tool (a data generating system) of the main-controlling machine reads and writes the data into a write cache of a memory; a read cache and the write cache are switched after data is completely written. When the distribution service inspects the read-write switching, a new read cache is started to be connected. At this time, if a data request of the ADX machine (a receiver) is received, data starts to be distributed synchronously to multiple ADX machines by using the ASK protocol. The ADX machine (the receiver) inspects whether a current write cache is large enough; if the write cache is excessively small, the current write cache is destroyed, and a write cache of a suitable size is re-created. After it is determined that the write cache is ready, received data is written into the write cache, and the read cache and the write cache are switched after writing is completed. When the ADX ask-bid system searches for the advertisement position information and the order information, if the ADX ask-bid system finds that the read cache and the write cache are switched, the ADX ask-bid system connects to a new read cache, and searches for the advertisement position information and the order information in the new read cache.

The implementation manners of the present disclosure are applicable to multiple application scenarios. For example, the implementation manners are particularly applicable to a one-to-many unidirectional reliable fast data transmission scenario with a small data amount (less than 2 G). For example, 1. in an ADX advertisement ask-bid system, advertisement position information and order information are distributed to an ADX server; 2. in a basic data service, IP database data is distributed to all service servers for a service to search for local IP data; and 3. in a log service system, colored configuration data is distributed to a service machine in real time.

Actually, the data distribution method and system, the data sending apparatus, and the data receiving apparatus provided by the implementation manners of present disclosure may be specifically performed in multiple forms.

For example, the data distribution method can be compiled as a plug-in program that is installed in a PC, a mobile terminal, and the like by using an application programming interface that conforms to a certain specification, and can also be encapsulated into an application program for a user to download and use individually. When the data distribution method is compiled as a plug-in program, the plug-in program may be performed as multiple plug-in forms such as ocx, dll and cab. The data distribution method provided by the implementation manners of the present disclosure may also be performed by using specific technologies such as a Flash plug-in, a RealPlayer plug-in, an MMS plug, an MIDI staff plug-in, and an ActiveX plug-in.

The data distribution method may be stored in various storage media provided by the implementation manners of the present disclosure by using an instruction or an instruction set. The storage media include, but are not limited to, a floppy disk, an optical disc, a DVD, a hard disk, a flash memory, a USB flash drive, a CF card, an SD card, an MMC card, an SM card, a memory stick, an XD card, and the like.

In addition, the data distribution method provided by the implementation manners of the present disclosure may also be applied to a storage medium based on a flash memory (Nand flash), such as a USB flash drive, a CF card, an SD card, an SDHC card, an MMC card, an SM card, a memory stick, and an XD card.

Figure 8:
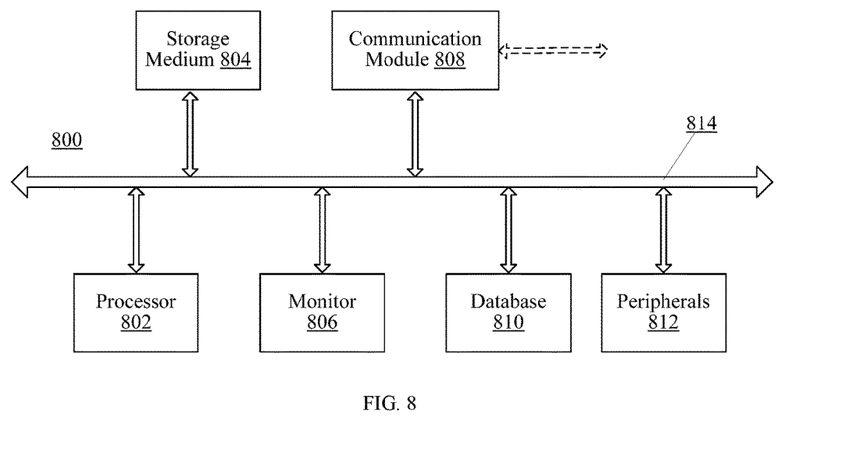
FIG. 8 illustrates a block diagram of an exemplary computer system consistent with the disclosed embodiments.

The disclosed data sending apparatus, data receiving apparatus, controller, receivers, data transmit end, data receive end, and/or various disclosed modules and units may be implemented using one or more computing systems. FIG. 8 illustrates an exemplary computing system consistent with the disclosed embodiments.

As shown in FIG. 8, a computing system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The storage medium 804 may include memory modules, e.g., Read-Only Memory (ROM), Random Access Memory (RAM), and flash memory modules, and mass storages, e.g., CD-ROM, U-disk, removable hard disk, etc. The storage medium 804 may store computer programs for implementing various processes (e.g., assembling a data request message, validating a data request message, assembling a data transmission message, distributing data to receivers in parallel), when executed by the processor 802.

The monitor 806 may include display devices for displaying contents in the computing system 800, such as displaying a software interface to indicate data transmission progress and report, or displaying a data version managing interface. The peripherals 812 may include I/O devices, e.g., touchscreen, keyboard and mouse for inputting information by a user. The peripherals may also include certain sensors, such as speaker, microphone, etc.

Further, the communication module 808 may include network devices for establishing connections through a communication network such as Internet or other types of computer networks or telecommunication networks, either wired or wireless. The database 810 may include one or more databases for storing certain data (e.g., to be updated/transmitted data, data category command number, data sequence number, data type, data version number, etc.) and for performing certain operations on the stored data.

In operation, the computing system 800 of the receiver may create a data request message by the processor 802, send the data request message to the controller through the communication module 808, receive the requested data from the controller through the communication module 808, store the received data in the storage medium 804, and reassemble a next data request message by the processor 802. Further, the computing system 800 of the controller may receive data request messages through the communication module 808 from one or more receivers, determine whether the data request messages are valid by the processor 802, and send the requested data to the receivers according to the disclosed method and ASK protocol.

To sum up, in the implementation manners of the present disclosure, data request messages that are sent separately from at least two data receive ends are received in parallel, the data request message including a field for describing requested data; and data corresponding to the fields for describing requested data is returned in parallel to data receive ends with the fields for describing requested data that are valid. Therefore, after the implementation manners of the present disclosure are applied, a data transmit end no longer stores a data transmission state; the data receive end takes the data transmit end exclusively; and data receive ends keeps independent of each other, so that data transmission efficiency can be improved.

In addition, the present disclosure implements high concurrency and a high speed: concurrent data distribution to each data receive end (the receiver) can be greatly supported, and a concurrent amount thereof theoretically may be infinite; the data receive ends do not affect each other; and bandwidth resources of the data transmit end (a controller) are shared by all the receivers.

In addition, the present disclosure implements no operation and maintenance need: a request for data distribution is initiated actively by the data receive end (receiver), so that the data transmit end (the controller) does not need to maintain a receiver list; and when a new machine is added, the data transmit end (the controller) does not need to sense.

In addition, the present disclosure fully uses bandwidth: after the data transmit end (the controller) replies a message to a receiver A, because of network latency, vacancy time exists before the data transmit end (the controller) receives a next data request message of the receiver A; this period of vacancy time may be used to serve machines such as receivers B, C and D; in this way, CPU resources and bandwidth resources of the data transmit end (the controller) are fully used; and when the concurrent amount is large, network traffic of the data transmit end (the controller) may reach an upper limit of a network interface card.

In addition, the present disclosure implements no traffic traversal: the data transmit end (the controller) needs to wait for a next data request message after sending data completely each time, and then continues to send; therefore, when a data distribution amount is large, a lot of vacancy time exists between the data receive end (the receiver) and the data transmit end (the controller), so that data sending is not always kept; in this way, sudden occupation on public bandwidth resources is avoided naturally; when a data mount of the data receive end (the receiver) is large, traffic overlap does not occur either; and because all the data receive ends (the receivers) are not distributed on a same rack in a same equipment room, a switch and a router that are passed through are not exactly the same; in this way, pressure is not caused to a switching device of a core node.

In addition, the present disclosure implements convenience for monitoring: each data receive end (the receiver) can send a data request message at a regular time (such as 3 s), so as to form a heartbeat message; which receivers are connected to the data transmit end (the controller) can be directly observed at the data transmit end (the controller); and which receivers complete update and which receivers still do not complete update can also be directly observed in real time according to data_version of the data request message.

In addition, the present disclosure implements distribution acceleration for long network latency: when a non-local receiver performs distribution, a low speed is mainly caused by long network latency; Data_pkg_count (a sliding window) of a data request message just needs to be increased for such a machine; and assuming that the sliding window is 1, and a distribution time is T, if Data_pkg_count is modified to n, the distribution time is changed to t=T/n, where t may theoretically be close to a time slice of network latency.

In addition, the present disclosure implements supporting both single distribution and group distribution: because the data transmit end (the controller) is non-state, and the receivers are independent of each other, when all other receivers complete distribution, distribution can be performed again separately for a newly added machine; when group distribution is needed, the group distribution can be started as long as the data transmit end (the controller) modifies a data version number (the data version number is increased by 1 to become a version number that is needed by the receiver); single distribution is generally initiated by the receiver, and group distribution is generally initiated by the data transmit end (the controller).

In addition, the present disclosure implements no blocking phenomenon: compared with previous serial distribution, serial distribution is changed to parallel distribution, so that failure of a standalone computer certainly does not affect an overall distribution speed.

In addition, the present disclosure implements incremental update and full update: in the case of a large amount of data, a Global_flag field of the present disclosure provides two (full/incremental) data update manners; and when incremental update is performed, a part where data changes is distributed to be updated into full data according to service logic of a service party by the service party.

In the present disclosure, non-state of a data transmit end (a controller) and exclusive file update of a data receive end ensure that an infinite quantity of data receivers can be supported to update simultaneously, and further breaks through a bottle neck of point to point serial transmission that is always performed according to a data transmission protocol, which becomes a one-to-many parallel application layer data transmission method.

In this embodiment, the data transmit end and the data receive end are any appropriate computing devices having one or more processors and a memory. The computing device, used herein, may refer to any appropriate device with certain computing capabilities (for example, controlling media data to be placed at a constant speed), such as a PC, a work station computer, a hand-held computing device (tablet), a mobile terminal (a mobile phone or a smart phone), a server, a network server, a smart terminal, or any other user-side or server-side computing device. The memory includes a storage medium, which may further include memory modules, for example, a Read-Only Memory (ROM), a Random Access Memory (RAM), and flash memory modules, and mass storages, for example, a CD-ROM, a UBS flash drive, a removable hard disk, and the like, which are all non-transitory storage medium. The storage medium may be a non-transitory computer readable storage medium that stores computer programs for implementing various processes, when executed by the processors.

The foregoing descriptions are merely preferred embodiments of the present invention, but are not intended to limit the protection scope of the present disclosure. Any modification, equivalent replacement, or improvement made within the spirit and principle of the present disclosure shall fall within the protection scope of the present disclosure.

What is claimed is:

1. A data distribution method, comprising:
at a computing device having one or more processors and a memory storing programs executed by the one or more processors:
receiving in parallel data request messages that are sent separately from at least two data receive ends, the data request message comprising a field for describing requested data; and
returning in parallel data corresponding to the fields for describing requested data to data receive ends with the fields for describing requested data that are valid;
wherein the method further comprises:
returning in parallel state reset messages to data receive ends with the fields for describing requested data that are invalid, wherein the state reset message comprises data description information;
constructing, by the data receive ends that receive the state reset messages, updated data request messages based on the data description information, wherein the updated data request message comprises an updated field for describing requested data; and
receiving the updated data request messages, and returning in parallel data corresponding to the updated fields for describing requested data to data receive ends with the updated fields for describing requested data that are valid.

2. The method according to claim 1, wherein the field for describing requested data comprises a data category command number, a data sequence number, a data type and a data version number, wherein the field for describing requested data is determined as invalid, when the data category command number matches a data category command number of existing data, and at least one of the data sequence number, the data type and the data version number does not match a data sequence number, a data type and a data version number of the existing data; and the field for describing requested data is determined as valid, when the data category command number matches a data category command number of existing data, and the data sequence number, the data type and the data version number match a data sequence number, a data type and a data version number of the existing data respectively.

3. The method according to claim 2, further comprising:

progressively increasing, by the data receive end after completely receiving data each time, the data version number in the field for describing requested data to form a data request message again; and receiving the data request message formed again, returning data corresponding to the progressively increased data version number when the data corresponding to the progressively increased data version number exists, and ending the procedure when the data corresponding to the progressively increased data version number does not exist.

4. The method according to claim 1, wherein the data receive ends maintain data transmission state information of the data receive ends separately, wherein the data transmission state information comprises at least one of the following:

a serial number of a current data request message; a time of sending a data request message last time; a quantity of packets expected by each data request message; a sequence number of a current packet in the current data request message; and a time of current data update.

5. A data distribution system, comprising:

at least two data receive ends, configured to send in parallel respective data request messages to a data transmit end, the data request message comprising a field for describing requested data; and the data transmit end, configured to return in parallel data corresponding to the fields for describing requested data to data receive ends with the fields for describing requested data that are valid;

wherein:

the data transmit end is further configured to return in parallel state reset messages to data receive ends with the fields for describing requested data that are invalid, wherein the state reset message comprises data description information;

the data receive ends that receive the state reset messages are further configured to construct updated data request messages based on the data description information, wherein the updated data request message comprises an updated field for describing requested data; and the data transmit end is further configured to receive the updated data request messages, and return in parallel data corresponding to the fields for describing requested data to data receive ends with the fields for describing requested data that are valid.

6. The system according to claim 5, wherein the field for describing requested data comprises a data category command number, a data sequence number, a data type and a data version number, wherein the data transmit end is configured to:

determine, when the data category command number matches a data category command number of existing data, and at least one of the data sequence number, the data type and the data version number does not match a data sequence number, a data type and a data version number of the existing data, that the field for describing requested data is invalid; and determine, when the data category command number matches a data category command number of existing data, and the data sequence number, the data type and the data version number match a data sequence number, a data type and a data version number of the existing data respectively, that the field for describing requested data is valid.

7. The system according to claim 6, wherein the data receive end is further configured to progressively increase, after completely receiving data each time, the data version number in the field for describing requested data to form a data request message again; and the data transmit end is further configured to receive the data request message formed again, return data corresponding to the progressively increased data version number when the data corresponding to the progressively increased data version number exists, and end the procedure when the data corresponding to the progressively increased data version number does not exist.

8. The system according to claim 5, wherein the data receive ends are further configured to maintain data transmission state information of the data receive ends separately, wherein the data transmission state information comprises at least one of the following:

a serial number of a current data request message; a time of sending a data request message last time; a quantity of packets expected by each data request message; a sequence number of a current packet in the current data request message; and a time of current data update.

9. A data receiving apparatus, comprising:

a memory;

one or more processors;

one or more program modules, stored in the memory and executed by the one or more processors, the one or more program modules comprising:

a data request message sending unit, configured to create data request messages, and send the data request messages, the data request message comprising a field for describing requested data; and a data receiving unit, configured to receive data corresponding to the fields for describing requested data, the data being returned in parallel when the fields for describing requested data are valid;

wherein the apparatus further comprising:

a state reset message receiving unit, configured to receive state reset messages, wherein the state reset messages are returned in parallel when the fields for describing requested data are invalid, and the state reset message comprises data description information, wherein the data request message sending unit is further configured to construct updated data request messages based on the data description information, wherein the updated data request message comprises an updated field for describing requested data; and the data receiving unit is further configured to receive data corresponding to the updated fields for describing requested data, wherein the data is returned in parallel when the updated fields for describing requested data are valid.

10. The apparatus according to claim 9, wherein the field for describing requested data comprises a data category command number, a data sequence number, a data type and a data version number, wherein the field for describing requested data is determined as invalid, when the data category command number matches a data category command number of existing data, and at least one of the data sequence number, the data type and the data version number does not match a data sequence number, a data type and a data version number of the existing data; and the field for describing requested data is determined as valid, when the data category command number matches a data category command number of existing data, and the data sequence number, the data type and the data version number match a data sequence number, a data type and a data version number of the existing data respectively.

11. The apparatus according to claim 10, wherein the data request message sending unit is further configured to progressively increase, after data is received completely, the data version number in the field for describing requested data to form a data request message again.

12. The apparatus according to claim 10, further comprising:

a transmission state maintaining unit, configured to maintain data transmission state information of the apparatus, wherein the data transmission state information comprises at least one of the following:

a serial number of a current data request message; a time of sending a data request message last time; a quantity of packets expected by each data request message; a sequence number of a current packet in the current data request message; and a time of current data update.

* * * * *